Nov. 15, 1938.   M. R. MILLER   2,136,559
TEMPERATURE CONTROL SYSTEM
Filed May 9, 1934

Inventor
Merton R. Miller
R. G. Richardson
Atty.

Patented Nov. 15, 1938

2,136,559

UNITED STATES PATENT OFFICE 2,136,559

TEMPERATURE CONTROL SYSTEM

Merton R. Miller, Evanston, Ill., assignor, by mesne assignments, to Associated Electric Laboratories, Inc., Chicago, Ill., a corporation of Delaware Application May 9, 1934, Serial No. 724,740

19 Claims. (Cl. 236—70)

This invention relates in general to temperature control systems, wherein means is provided for automatically regulating heating or cooling apparatus, or both, for the purpose of maintaining the temperature at some point within desired limits; and the object of the invention, generally stated, is to provide a more efficient and accurate system of this character than has heretofore been available.

According to a particular feature of the invention a Wheatstone bridge is employed through the medium of which the temperature may be tested electrically. The bridge is so arranged that it is in balanced condition only at a particular desired temperature, this result being accomplished, for example, by employing two opposite bridge arms constructed of materials having different temperature coefficients. Current may be supplied to the bridge circuit periodically. A sensitive relay is connected up each time so as to detect an unbalanced condition, such as would result from a rise or fall in the temperature changing the resistance of one bridge arm more than the other, because of their different temperature coefficients. The sensitive relay is used to control the starting of a suitable means for returning the temperature to normal.

The foregoing and other features of the invention will be described more in detail hereinafter, reference being made to the accompanying drawing.

Figure 1:
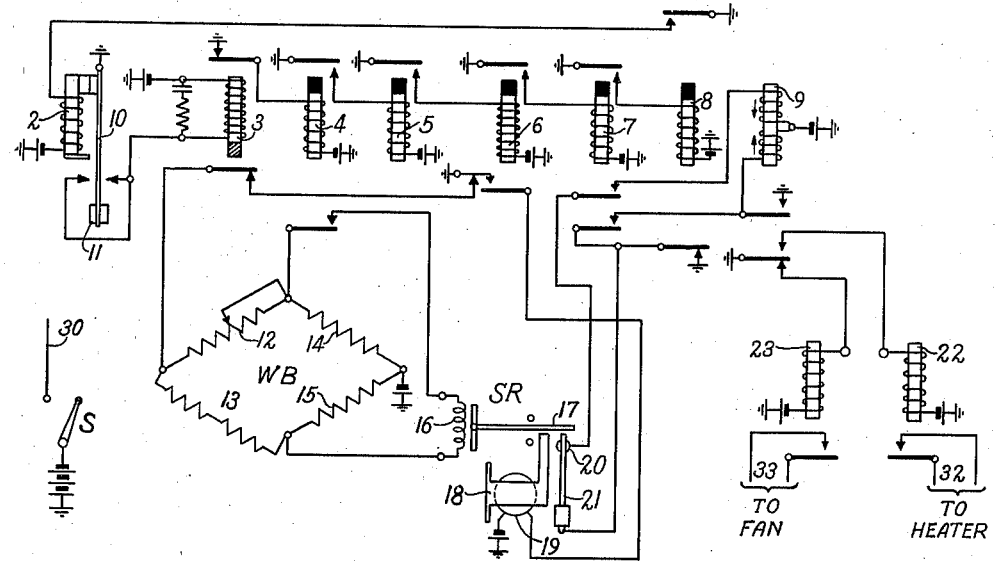
Figure 2:
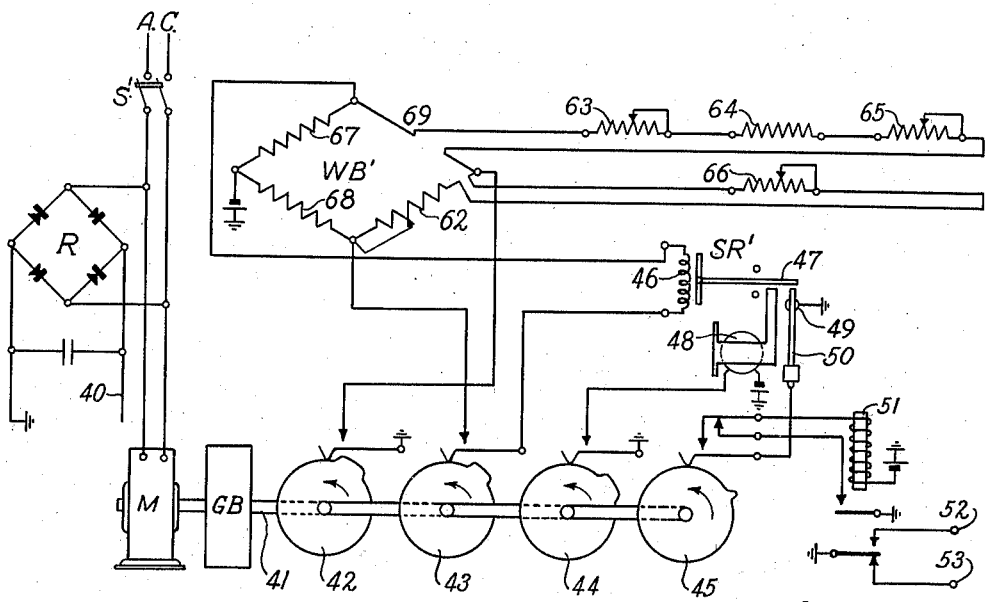

In the drawing, Fig. 1 is a diagrammatic circuit drawing of a temperature control system embodying the invention, while Fig. 2 is a similar circuit drawing of a modified type of system.

Referring to Fig. 1, there are shown a number of relays 2 to 9, inclusive, and 22 and 23. The latter are ordinary relays. Relays 4 to 8, inclusive, are of the slow to energize type, as indicated by the shaded portions at the upper ends of the cores. 9 is a differential relay. 2 is a special relay having a weighted reed armature which vibrates pendulum fashion between two contact points when the relay is deenergized, eventually coming to rest out of contact with both of them. 3 is a slow to release relay.

The reference letters WB indicate a Wheatstone bridge. Arm 13 is the arm whose resistance changes in accordance with changes in temperature and is preferably made of material having a high temperature coefficient, such as copper or nickel wire. Iron wire is also suitable, and platinum or other wire having a high melting point could be used if high temperatures are to be dealt with. The opposite bridge arm 12 is preferably constructed of material having a low temperature coefficient, such as Advance wire, which is a nickel and copper alloy composed of about 45 per-cent nickel and 55 per-cent copper. The resistance of bridge arm 12 may be adjustable, as indicated in the drawing. The bridge arms 14 and 15 may also be of Advance wire, although this is not necessary so long as they are similar and are located close together or at points having the same temperature.

The reference letters SR indicate a sensitive relay of the galvanometer type such as is disclosed, for example, in U. S. Patent No. 1,852,980. This relay, shown herein only diagrammatically, comprises a galvanometer coil 16, operating a light pointer or rod 17, a pair of contacts 20 and 21, and a magnet 19 which is provided with an armature 18. When the rod 17 is deflected in a clock-wise or + direction, the end passes just above the contact spring 21 and just below the projection on armature 18, these parts being adjusted in different planes so as to provide for the free movement of rod 17 as stated. Now, if the magnet is energized while rod 17 is deflected, contact spring 21 will be pressed down against contact 20.

The reference letter S indicates a switch for connecting a battery or other current source to the apparatus. The drawing shows a grounded battery, having its live pole connected to the switch S, through which it may be extended to bus bar 30. It will be understood that whenever battery symbols are used in the drawing these symbols mean that the various relays, etc., with which the battery symbols are used are in fact connected to the bus bar 30 instead of to separate batteries.

No heating or cooling apparatus is shown, since any desired types may be used, and since the invention relates to the method and arrangement for controlling the temperature, rather than to the means employed for furnishing or abstracting heat. There are shown, however, two circuits 32 and 33, controlled by relays 22 and 23, respectively, through which any necessary or desired control may be exercised. For example, circuit 32 may be used for starting up some type of heating apparatus, while circuit 33 may be used for starting up a cooling system. If control is to be effected by starting and stopping only a source of heat, then circuit 32 only need be used. All this will be explained in detail hereinafter as the different applications to which the invention may be put are explained.

Referring now to Fig. 2, it may be stated that the system herein shown is designed to operate from the ordinary power or lighting circuit. The reference letters AC indicate the taps to the lighting circuit, and S' is a switch. R is a rectifier supplying direct current to bus bar 40, to which certain of the equipment items are connected as indicated by the battery symbols.

In place of the relay chain used in Fig. 1, a small motor and a series of cams driven thereby are employed. The motor, which may be a small synchronous motor such as is used in clocks, is indicated by M. GB indicates a gear box containing speed reducing gears through the medium of which the motor M drives the cam shaft 41 at any desired speed, say 1 revolution per minute. Under some conditions a still slower speed may be desirable. The cams 42 to 45, inclusive, are fixed to shaft 41 and close circuits as shown.

The bridge WB' corresponds generally to the bridge WB shown in Fig. 1. It may be pointed out, however, that the arm 69, whose resistance varies in accordance with temperature changes, comprises three separate resistances 63, 64, and 65, the functions of which will be explained later. The opposite arm includes a portion 66, which is adjustable.

The reference letters SR' indicate a sensitive relay similar to SR, Fig. 1. 51 is a testing relay, whose functions correspond to those of relay 9, Fig. 1. 52 and 53 are connected to the circuits for controlling the heating or cooling system.

The operation of the system shown in Fig. 1 will now be explained. For this purpose it will be assumed that it is desired to maintain the temperature in a certain room of a building within very close limits. An example of such a situation is an electrical testing laboratory, where the maintenance of a rigidly uniform temperature within fine limits will obviate the large amount of work involved in making temperature corrections in calculating the results of tests and measurements.

In a typical installation of the above character, the control equipment shown in Fig. 1 may all be located in the room whose temperature is to be controlled, with the possible exception of relays 22 and 23. The apparatus is mounted in any convenient manner, including the bridge elements 12, 14, and 15. The bridge element 13, however, is preferably made in the form of a single layer coil, flat or round, with spaced turns, so that all the individual turns will be exposed to the air in the room. In the case of a small room, one coil will suffice, but if the room is large the total resistance may be divided between two or more coils placed at different points in the room. The bridge may be balanced in accordance with resistance calculations before it is placed in operation. For example, the arms 14 and 15 may be made exactly equal, and since they are of the same material and in the same location they will stay equal. Coil 13 having been constructed, the resistance of this arm is then calculated for the temperature which is to be maintained, say 70°, and arm 12 can be made to have exactly this resistance at the same temperature. However, for various reasons it is desirable to make arm 12 of somewhat higher resistance than is required for balance at the required temperature and employ an adjusting means as indicated to cut out part of this resistance. For one thing, it may be desirable to change the temperature value which is to be maintained. Also it might become convenient to move arm 13, thus changing the length of the leads connecting it in the bridge circuit and making it necessary to readjust arm 12.

The means employed for raising or lowering the temperature of the room will depend on conditions and under certain circumstances only one such means need be employed. For instance, if the building temperature is always lower than 70°, then it will only be necessary to supply heat to the room in question in order to maintain it at the correct temperature, the supply being shut off from time to time as required. However, the selected temperature of 70° is about an average value, and it will usually be the case, therefore, that the building temperature will at times be higher than this while at other times it will be lower. Hence it is necessary under such conditions to provide both heating apparatus and a cooling system. A somewhat closer control can be accomplished in any case.

For the purpose of this explanation it will be assumed that circuit 32 is used to turn on the heat supply, which may be an electric heater located in the room. Circuit 33 is used to start up the cooling system, which may be an electric fan arranged to blow cool air into the room. It will be assumed also that the temperature in the room is correct, standing at 70°.

The apparatus is started in operation by closing the switch S. Relay 23 pulls up to start the fan. At the same time current is supplied to the bridge circuit through contacts of relays 6 and 3. It will be seen, also, that there is a circuit for relay 4, and this relay pulls up, closing a circuit for relay 5 and also closing the galvanometer circuit. Relay 4 is made slow to operate so as to allow an interval of time between the connecting of current to the bridge circuit and the closing of the galvanometer circuit, which makes it unnecessary to balance the bridge as regards the inductance of the bridge arms. Since the fan is just starting it will be assumed that the temperature is still correct; hence there will be no substantial deflection of the galvanometer.

Slow to operate relays 5 and 6 now pull up in succession, relay 5 closing the circuit of relay 6. The latter relay closes a circuit for relay 7, and also closes a circuit for the magnet 19 of the sensitive galvanometer relay SR. At the same time the supply of current to the bridge circuit is cut off. The operation of magnet 19 has no effect since the galvanometer is not deflected. It should be pointed out that slow to operate relays 5 and 6 provide a time interval sufficient to allow the galvanometer to steady down in case it is deflected. It should be noted also, that the removal of current from the bridge at this point is desirable in order to avoid heating the bridge arms and thus changing their resistance independent of the temperature in the room.

Relays 7 and 8, which are slow to operate, now operate in succession to momentarily connect up the testing relay 9. It will be seen that relay 7, upon energizing, closes points in two circuits for relay 9. One of these circuits, extending from ground at the lower contact of relay 8 and including the lower winding of relay 9, is always completed for current flow. The other circuit, extending from the same ground contact and including the upper winding of relay 9, includes also the contact 20 and spring 21 of the relay SR, and consequently will be closed for current flow only if the said spring 21 is in engagement with contact 20. In the present case this has not occurred and hence the circuit through the upper winding of relay 9 will remain open, although relay 7 is energized. Relay 9 accordingly operates and closes a locking circuit for itself through its lower winding. An instant later relay 8 pulls up and at its lower contact removes ground from the circuits of relay 9. With relay 9 in operated position, relay 23 falls back and relay 22 pulls up. Thus the fan is shut off and the heat is turned on.

Continuing with the operation, when relay 8 operates it closes a circuit at its upper contact for the vibrating relay 2. This relay accordingly operates, the reed 10 being drawn to the left where it closes a circuit for the relay 3. The latter relay, upon operating, opens another point in the bridge circuit at its lower contact and opens the circuit of relay 4 at its upper contact. Relays 4 to 8, inclusive, now restore to normal in succession. Since they are somewhat slow to release as well as slow to operate a brief interval will elapse before the last relay 8 falls back. When this occurs the circuit of relay 2 is broken and the relay is deenergized. However, the reed 10 is provided with a weight 11 which vibrates the reed back and forth between the associated contacts, thus sending impulses to relay 3, which maintain it in operated position. Being slow acting, relay 3 cannot respond to the brief interruptions in its circuit. This operation continues for some time, as determined by the characteristics and adjustment of relay 2, and provides the principal spacing between successive temperature tests.

Eventually the amplitude of the vibrating reed 10 will die down sufficiently to prevent any more impulses being sent to relay 3. This relay thereupon falls back, again closes the circuit of relay 4, and again connects up current to the bridge circuit, with the result that the apparatus goes through the same cycle of operations just described and repeats the test of the temperature.

Several tests may be performed in this way before the temperature rises an amount sufficient to be detected. When the temperature goes up a little, the next time relay 4 connects up the galvanometer coil 16, the member 17 will be deflected. The unbalanced condition of the bridge which causes the deflection is due to a rise in the temperature of the bridge elements, which increases the resistance of arm 13 to a value greater than the resistance of arm 12; and it will be assumed that the wires going to the galvanometer coil 16 are so connected that the current flow resulting from this particular unbalanced condition will cause member 17 to be deflected in a + or clockwise direction, thus introducing member 17 between the armature 18 and spring 21. Under these conditions, when relay 6 operates and closes the circuit of magnet 19, the armature 18 will press spring 21 against contact 20 through the medium of member 17. Therefore, when relay 7 closes the testing circuits for relay 9, both these circuits will carry current, and since relay 9 is differentially wound, it will fall back, opening its locking circuit. Both testing circuits are opened at the same time by relay 8, and relay 9 therefore remains deenergized for the time being. Relay 22 therefore falls back to shut off the heat, while relay 23 operates to start up the fan again.

The apparatus continues to operate, automatically testing the temperature by means of the bridge at regular intervals, and for several tests may find that the bridge is unbalanced. Relay 9 will therefore remain in deenergized condition. It will be observed that the circuit through the lower winding of this relay tries to operate it each time the temperature is tested, but is prevented from doing so by the circuit through the upper winding which will be closed at 20—21 so long as the temperature tests too high. Before long the action of the fan will reduce the temperature to normal. Upon the next test, it may be that the bridge will be exactly balanced, in which case contacts 20 and 21 will not be closed upon the operation of magnet 19 and relay 9 will therefore operate. Thus the fan is stopped and the heat is turned on.

It should be noted that the same result is secured if the bridge should be found to be unbalanced the other way, as a result of the cooling operation having carried slightly too far. That is, if the bridge should become unbalanced due to the resistance of arm 13 being less than the resistance of arm 12, relay 9 is operated, or if already energized, it stays energized. This is because under such a condition of unbalance the galvanometer current will be in the opposite direction from what it is for the other condition of unbalance and the member 17 will be deflected in a counterclockwise direction. Obviously the result will be the same as if no galvanometer current is detected at all.

It will be seen therefore, that the equipment will remain in continuous operation so long as the switch S is closed, and will test the temperature periodically by means of the bridge circuit, which is set so as to be in exact balance at the desired temperature. Any change in temperature is effective to unbalance the bridge because of the different temperature coefficients of the wires comprising arms 13 and 12. An unbalance due to excess resistance in arm 13 (temperature too high) causes the heat to be shut off and the fan to be started; while an unbalance due to a deficiency in arm 13 (temperature too low), or a balanced condition (temperature correct), will cause the heat to be turned on and the fan to be stopped. By thus alternately turning on the heat and starting up the fan as required the temperature is maintained within a very small range.

It will be noted that one factor which might affect the accuracy of the regulation secured is the inability of the resistance arm 13 to instantly conform to the room temperature. However, if this resistance arm is properly constructed the lag can be made practically negligible. Another factor is the frequency at which the temperature is tested. It will be clear that the accuracy will increase as the frequency is increased. For extreme accuracy therefore the apparatus should be adjusted to operate with only a brief spacing between successive tests. On the other hand, the frequency should not be higher than is necessary to maintain the temperature within the desired limits, thus avoiding unnecessary operation and resulting wear of the equipment.

As an example of what can be done, it may be stated that with a properly designed resistance 13 and with proper adjustment of the testing frequency the temperature can be held within a range of less than one tenth of a degree Fahrenheit. To secure these results, the apparatus should be set to repeat the temperature tests at intervals of about five seconds. The resistance arm 13 may be a single layer flat coil of copper wire, having spaced turns, wound on two insulating rods about three-fourths of an inch in diameter and spaced six inches apart. The resistance of this coil may be approximately 500 ohms.

In the system the operation of which has been described, the heat is on and the cooling system is shut down when the temperature is at normal. The equipment will work equally well, however, by arranging matters so that with the temperature at normal, the heat is off and the cooling system on. In order to operate the equipment in this way the leads to relays 22 and 23 should be reversed, and also the leads to the galvanometer coil 16.

Assuming now that the temperature is normal, and the operation of the equipment is started by closing switch S. Relay 22 pulls up to start the heater, and the relay apparatus starts working to make a test of the temperature, as previously described. Since the temperature is assumed to be normal, relay 9 is operated on the first test, causing relay 22 to fall back and relay 23 to energize. The latter relay starts the fan.

The cooling system continues to run, and the testing equipment operates periodically, as described, until upon some test the bridge is found to be unbalanced, the condition occurring because the resistance of arm 13 has become less than the resistance of arm 12. Since the leads to the galvanometer coil 16 have been reversed, the galvanometer current which now flows causes the member 17 to be deflected to the right, and upon the operation of magnet 19 contacts 20—21 are closed. Thus when relay 7 operates, both circuits of relay 9 will be closed and the said relay will fall back. This energizes relay 22 to start the heater and stops the cooling system by de-energizing relay 23, it being remembered that the wires leading to these two relays have been reversed.

The heater being on, the temperature will rise slightly until the bridge again becomes balanced. This condition will be detected on the next test, with the result that relay 9 is again energized, with obvious results. It should be noted that if the heating should carry slightly too far, so as to unbalance the bridge in the opposite direction, the member 17 of the galvanometer relay will be deflected in a counterclockwise direction.

Referring now to Fig. 2, the operation of the modification there shown will be described. It will be assumed, for example, that the equipment is to be used to control the temperature of a residence building, during a period when artificial heat is required, as in the winter time. Under these conditions, of course, no cooling system would be used. Any desired type of heating plant may be installed. The circuit for starting up the heating system, opening the draft, or whatever has to be done to supply heat to the building, may be connected to terminal 52, so that the circuit is closed whenever relay 51 is energized. It will be clear, however, that the arrangement may be such that the operation of the heating system may be initiated, or accelerated, when a circuit is broken, in which case the circuit in question would be wired to terminal 53. Or some combination arrangement might be used in which both circuits are employed.

All of the equipment, except resistances 63 to 66, inclusive, may be located at any convenient point, where it will be protected and be free from disturbance. Resistance 66 forms part of arm 62 of the bridge and it preferably is located where it is conveniently accessible for adjustment. It may be of advance wire, like the remaining portion of arm 62, although this is not strictly necessary. This adjustable resistance 66 may be in the form of a rheostat which is calibrated for different temperatures. The adjustment may be changed automatically at different times of the day, if desired. Resistance 64 forms the main control element in the arm opposite arm 62, and should be located at a central point selected for a control point. However, the resistance can be divided into two or more sections if desired, each section being placed in a different room, so that the equipment will be made to test the average temperature in such rooms. Resistance 65 is an auxiliary control element which is intended to be directly affected by the source of heat, and is independent of the atmospheric temperature in the rooms. If a hot water heating system is used, for instance, resistance 65 may be located close adjacent to one of the main hot water pipes, or the boiler itself. Resistance 63 is an auxiliary control element which is located outdoors, where it will be subject to outside temperatures. If the control resistance or resistances are located at a considerable distance from the bridge, it may be advisable to parallel the connecting leads with a pair of wires which are in the other arm of the bridge. This pair of wires can be used to connect up resistance 66 if it is also located at a remote point, where one of the resistances such as 64 is located.

It will be assumed that the plant is started up from a cold condition, with the room temperature considerably below the temperature for which resistance 66 is set. When the switch S' is closed, current is supplied to motor M, and also the bus bar 40 is rendered alive through rectifier R. The motor M rotates shaft 41 through the medium of reduction gears in the gear box GB. Since a particularly close control will not be required, the speed of shaft 41 may be slow, one revolution per minute, or slower.

Cam 42 is the first to close its contact. This operation supplies current to the bridge WB'. A brief interval later, cam 43 closes the circuit of the galvanometer coil 46 to test the bridge. Since the temperature is considerably below normal, the resistance of arm 69 will be less than that of arm 62, and there will be a flow of current in coil 46. The coil is so connected that this current causes a deflection of member 47 in a clockwise direction. An instant later, and just before the cams 42 and 43 open their contacts, cam 44 closes a circuit for magnet 48. Since member 47 is in deflected position, as explained, the operation of magnet 48 now closes contacts 49 and 50. Finally, just before cam 44 opens its contact, cam 45 becomes momentarily effective and closes a circuit for relay 51, said circuit extending from the grounded contact 49. Relay 51 accordingly energizes and places ground on terminal 52. This latter operation establishes the condition of the heat being on. Relay 51 remains locked up after cam 45 moves on.

The apparatus continues to run now, with the heat on. Resistance 63, being located outside, is not affected. Resistance 64 gradually increases as the temperature in the rooms rises. Resistance 65 increases in value much more rapidly, since its temperature depends on the activity of the heat source, independent of the room temperatures. Now the resistances in arm 69 are so proportioned that at some particular room temperature which is lower than normal and with some particular temperature of resistance 65 which exceeds the temperature required to maintain the rooms at normal, the bridge will become balanced. When this condition obtains, no galvanometer current will flow on the next test, contacts 49—50 will not be closed, and relay 51 will be unlocked by cam 45, with the result that the heat supply is shut off.

It will be seen that the function of resistance 65 is to anticipate a rise in the room temperature above normal, which would inevitably occur if the fuel consumption were not terminated or decreased before the room temperature reached normal. The relative proportions of the resistances in arm 69 will vary widely with different types of heating systems and for different conditions of heat radiation, etc. In a hot water heating system, gas fired, for example, a relatively large amount of heat is stored in the water circulating system and in the boiler, with the result that heat would continue to be delivered to the rooms for some time after the gas is shut off. The resistances may be so proportioned, therefore, that the gas is shut off when the room temperature is still several degrees below normal, the stored heat being depended on to bring the temperature up to the desired point. With a hot air system, on the other hand, it will be obvious that the proportioning of the resistances would have to be different, for the amount of heat stored up in such a system is much less than in a hot water system. Of course, in any case it is assumed that the heating system has some capacity in reserve, which every well designed system does have under normal conditions.

The extent to which the heating system will raise the room temperature after the fuel consumption has been shut down depends also on the amount of heat losses from the rooms which in turn depends on various factors including the outside temperature. This latter variable is taken care of by resistance 63. For example, if the outside temperature is low, there will be greater heat losses, and consequently the heat should not be shut off as soon as when the outside temperature is higher. Resistance 63, being subject to outside temperature, introduces a compensating variable in arm 69 which brings about this result. However, resistance 63 also has another function which will be described at a later point.

Continuing now with the operation, the consumption of fuel has been shut down but the temperature of the room keeps on rising due to the heat stored up, which is being radiated into the rooms. Under these conditions resistance 65 is cooling off and is decreasing in value while resistance 64 is increasing. In many cases, therefore, the bridge may stay in balance until normal room temperature is reached. If resistance 65 falls off too fast, in some particular installation, it will merely result in starting up the consumption of fuel again for a short interval.

It will be assumed now that the room temperature eventually rises slightly above normal, after the fuel supply has been cut off, as may be the case under certain conditions or in particular installations. When this occurs the bridge may become unbalanced due to the resistance of arm 69 becoming greater than the resistance of arm 62. The resulting galvanometer current, however, will be in the wrong direction to secure the closure of contacts 49 and 50, and relay 51 will therefore remain deenergized.

Eventually now the temperature will fall slightly. When this occurs, the original unbalanced condition of the bridge will obtain, due to a decrease in resistances 65 and 64, and will be detected upon the next temperature test. Thus relay 51 will be operated and locked up, and the fuel supply will be turned on again.

It will be assumed now that with the system otherwise running normal, a sudden fall in the outside temperature takes place. Resistance 63 at once responds to the new condition and lowers the resistance of arm 69 slightly so that the heat supply is turned on somewhat earlier than it would be if resistance 64 alone were relied on. Resistance 63 thus takes cognizance of the fact that a somewhat greater amount of heat will be required to compensate for the increased heat losses which are about to take place, and anticipates the undesirable reduction in room temperature which might otherwise take place before the heating system could be brought up to the requisite condition of activity.

In view of the many variables which are involved, some of which have been mentioned, it will be impossible to give any exact proportions for the resistances 63, 64, and 65. The correct proportions can be found by trial in any given installation, in accordance with the conditions obtaining, and the views of the operator as to the relative influence the respective resistances should have on the control as a whole. Under most conditions, however, the major portion of the control will be exercised by resistance 64 and therefore this element should constitute the larger proportion of the total resistance in arm 67.

This is not to say that the unbalanced conditions of the bridge which bring about the regulation are created primarily by changes in the value of resistance 64. On the contrary, this resistance exercises its control mainly by introducing a resistance factor in arm 67 which corresponds to the room temperature, and thus causes the resistances 63 and 65, which are subject to wide changes in value, to work toward a desired mean temperature. Under normal running conditions, the temperature will be kept substantially constant, and there will be practically no change in resistance 64, the unbalanced conditions of the bridge as they occur from time to time being due principally to the affect of changes in resistance 65, as modified by changes in resistance 64.

As described in connection with Fig. 1, the equipment shown in Fig. 2 will also operate in a modified manner if the galvanometer coil is reversed. This will be clear enough and need not be described in detail.

While I have described in detail several specific embodiments of my invention, to the end that the same may be clearly understood, it will be appreciated that the invention is in no way limited to the particular arrangements explained, and that it may have numerous other practical application. For example, instead of using the apparatus to control a heating system, it may equally well be used to control a cooling system, for use during hot weather, or a refrigerating system such as is used in a packing plant or in other industries. Furthermore, the apparatus is not limited to the control of moderate temperatures, but it can be used also for controlling excessively low or high temperatures. The latter result is in fact only limited by the possibility of choosing resistance materials having a sufficiently high melting point. I do not, therefore, wish to be limited to the precise construction and applications shown and described, but desire to include and have protected by Letters Patent all forms of my invention which come within the scope of the appended claims.

What is claimed is:

1. In a system of temperature control, a Wheatstone bridge circuit having one arm composed of material which has a greater temperature coefficient than the material comprising the opposite arm, said bridge circuit including a relay in the bridge, means for periodically connecting a source of current to the bridge circuit, means for momentarily closing the bridge including said relay while the current source is connected, and temperature controlling means controlled by said relay.

2. In a system of temperature control, a Wheatstone bridge circuit, one arm of which has a greater temperature coefficient than the opposite arm, a relay in the bridge, means for periodically supplying current to the bridge circuit and for closing the relay circuit to test the bridge for balance, a temperature control relay, means operated each time the bridge is tested for changing the operative condition of said temperature control relay, and means controlled by the relay in the bridge for preventing such change dependent on whether or not the bridge is balanced.

3. In a system of temperature control, means for regulating the temperature at a certain point, a Wheatstone bridge comprising resistance arms and a relay sensitive to an unbalanced condition of the bridge for controlling said regulating means, said resistance arms being exposed to temperature changes at said point, materials having different temperature coefficients included in two opposite arms of said bridge, respectively, whereby the same will balance only at a particular temperature, means for intermittently supplying current to the bridge, and means for operatively connecting said relay to the bridge for a portion of each period in which the current supply is on.

4. In a temperature control system, an element whose resistance varies with its temperature, means for electrically testing said element at intervals to detect any change in its resistance, means for shutting off the testing current between tests to prevent raising the temperature of said element by current flow therein, and temperature regulating means controlled responsive thereto if a change in resistance is detected.

5. In a temperature control system, a Wheatstone bridge circuit having at least one resistance arm exposed to temperature changes where the temperature is to be controlled, means for intermittently connecting current to the bridge circuit, means for connecting a relay in the bridge after the current has been connected and while the current is on, a testing circuit including contacts of said relay, means for closing said testing circuit while the relay is connected in the bridge, and temperature regulating means controlled over said testing circuit.

6. In a temperature control system, a Wheatstone bridge circuit including two opposite arms exposed to temperature changes where the temperature is to be controlled, said arms being composed of materials, respectively, whose temperature coefficients are different, means for only momentarily applying a source of current to the bridge, whereby heating of the bridge arms by current flow therein is avoided, means for testing the bridge for balance, and temperature regulating means controlled by said testing means.

7. For use in a temperature control or similar system, a Wheatstone bridge circuit having two opposite arms composed of materials having equal temperature coefficients and two opposite arms composed of materials having unequal temperature coefficients, whereby the bridge will be balanced only at a particular temperature, and means for periodically applying current to the bridge circuit, the current being applied each time for such a short interval that the temperature of the bridge arms is not appreciably raised by the current flow therein.

8. For use in a temperature control or similar system, a Wheatstone bridge circuit comprising four resistance arms, a source of current, and a device for detecting whether the bridge is balanced or not, together with means for periodically connecting the circuit source to the bridge circuit, means for connecting the said device each time the current source is connected, and means for delaying the connection of the device long enough to permit the current in the bridge arms to attain a steady value.

9. In a temperature control system, a double wound differential relay, temperature regulating means controlled by said relay, means for periodically energizing one winding of said relay, means dependent upon the temperature for energizing the other winding when the first winding is energized, said relay operating if the second winding is not energized, and a locking circuit for said relay.

10. The method of controlling temperature in a given space to maintain the temperature therein at a substantially constant predetermined value which comprises, continuously varying the temperature of said space within narrow limits by adding heat while the temperature is at said predetermined value, periodically testing the temperature to detect a rise, shutting off the heat as soon as a rise is detected, and starting a cooling operation after the heat is shut off.

11. The method of controlling temperature in a given space to maintain the temperature therein at a substantially constant predetermined value which comprises, continuously varying the temperature of said space within narrow limits by supplying heat to said space when the temperature therein is at a predetermined value, periodically testing the temperature in said space, shutting off the supply of heat and starting the subtraction of heat whenever any test indicates that the temperature is too high, and stopping the subtraction of heat and restarting the supply of heat whenever any test indicates that the temperature is again at said predetermined value.

12. The method of controlling temperature in a given space to maintain the temperature therein at a substantially constant predetermined value which comprises, continuously varying the temperature of said space within narrow limits by alternately adding and subtracting heat to and from said space respectively, periodically testing the temperature in said space, starting the addition of heat and stopping the subtraction of heat when any test indicates the temperature is too low, and reversing these steps whenever any test indicates that the temperature is again at said predetermined value.

13. In a temperature control system for cooperation with heating apparatus and cooling apparatus, a Wheatstone bridge, means for testing said bridge for balance, means for maintaining one apparatus in operation while tests show the bridge is balanced, means responsive to a test that determines the bridge to be unbalanced for substituting the other apparatus and means responsive to a test that determines the bridge is again balanced for reversing the substitution.

14. In a temperature control system, a Wheatstone bridge having at least one arm exposed to temperature changes at the point where the temperature is to be controlled, means for testing said bridge for balance, means for continuously supplying heat at said point notwithstanding that tests show the bridge to be balanced, means for shutting off the heat responsive to a test that shows the bridge is unbalanced, and means for restarting the supplying of heat responsive to a test that shows the bridge is again in balance.

15. In a temperature control system, a Wheatstone bridge having at least one arm exposed to temperature changes at the point where the temperature is to be controlled, means for testing said bridge for balance, means for maintaining cooling apparatus in operation notwithstanding that tests show the bridge to be balanced, means for stopping the cooling apparatus responsive to a test that shows the bridge has become unbalanced, and means for restarting the cooling apparatus responsive to the next test that shows the bridge is again in balance.

16. In a system of temperature control, a Wheatstone bridge circuit, at least one arm of which is subject to temperature changes at the point where the temperature is to be controlled, means for testing said bridge for balance and for detecting two conditions of unbalance one due to a rise in the resistance of said arm and the other due to a decrease in such resistance, and temperature control means which is affected in the same way by a test which determines a condition of balance or one condition of unbalance and in a different way by a test which determines the other condition of unbalance.

17. The method of detecting temperature changes by means of a Wheatstone bridge, which consists in utilizing resistances having different temperature coefficients as two arms of the bridge, exposing said arms to the temperature changes, utilizing the different temperature coefficients of said arms to unbalance the bridge if a change in temperature occurs, periodically testing the bridge for balance to determine if the same has become unbalanced, and preventing an unbalance due to the testing current heating the bridge arms by stopping the flow of the testing current between tests.

18. In a system of temperature control, a bridge circuit having a pair of terminal points and including a plurality of arms each comprising a resistance element, the two resistance elements forming, respectively, two opposite arms of said bridge circuit having temperature coefficients of resistance so related that a potential difference, representing a condition of unbalance in said bridge circuit, is developed between said terminals when the temperature of said two elements departs from a predetermined value, a normally open testing circuit connected between said terminals and including a device operative in response to a potential difference between said terminals, continuously operating circuit-interrupting means for periodically completing said testing circuit, and means responsive to the operation of said device for initiating an operation which will produce the necessary temperature change to bring said bridge circuit into balance.

19. In a system of temperature control, a bridge circuit having a pair of terminal points and including a plurality of arms each comprising a resistance element, the two resistance elements forming, respectively, two opposite arms of said bridge circuit having temperature coefficients of resistance so related that a potential difference, representing a condition of unbalance in said bridge circuit, is developed between said terminals when the temperature of said two elements departs from a predetermined value, a normally open circuit for energizing said bridge circuit, continuously operating circuit - interrupting means, means comprising said circuit-interrupting means for periodically completing said energizing circuit, a normally open testing circuit connected between said terminals and including a device operative in response to a potential difference between said terminals, means comprising said circuit-interrupting means for periodically completing said testing circuit during each interval when said bridge circuit is energized, and means responsive to the operation of said device for initiating an operation which will produce the necessary temperature change to bring said bridge circuit into balance.

MERTON R. MILLER.